United States Patent [19]

Best et al.

[11] Patent Number: 5,297,185
[45] Date of Patent: Mar. 22, 1994

[54] PATTERN DETECTION AND SYNCHRONIZATION CIRCUIT

[75] Inventors: Donald T. Best, Colorado Springs, Colo.; Alvin Schultz, East Greenville; Richard C. Carickhoff, North Wales, both of Pa.

[73] Assignee: North American Philips Corporation, New York, N.Y.

[21] Appl. No.: 835,644

[22] Filed: Feb. 13, 1992

[51] Int. Cl.$^5$ .............................................. H04L 7/00
[52] U.S. Cl. ..................................... 375/116; 375/119; 370/105.4
[58] Field of Search ................. 375/116, 119; 360/51, 360/40; 369/59, 48, 124; 341/59; 370/105.4, 105.5, 106, 120; 371/47.1, 37.1; 307/231; 328/139

[56] References Cited

U.S. PATENT DOCUMENTS

| | | | |
|---|---|---|---|
| 4,231,071 | 10/1980 | Anderson | 360/40 |
| 4,675,652 | 6/1987 | Machado | 341/59 |
| 4,847,877 | 7/1989 | Besseyre | 375/116 |

OTHER PUBLICATIONS

QIC Development Standard-1350 Revision E 17 Jan. '90.
IEEE Transactions of Magnetics, vol. MAG-20, No. 5, Sep. 1984, "Monte—Carlo Analysis of Recording Codes" by Paul K. Davis, p. 887.
IBM J. Res. Develop, vol. 33, No. 1, Jan. 1989, "Statistical Properties of Selected Recording Codes", by Thomas D. Howell, pp. 60-73.

*Primary Examiner*—Stephen Chin
*Assistant Examiner*—Tesfaldet Bocure
*Attorney, Agent, or Firm*—David R. Treacy

[57] ABSTRACT

For identifying a preamble or other pattern in a binary bit stream, containing data coded to have a different average number of ones to zeroes from the pattern in question, a pattern detection circuit includes a shift register, a unitary adder and a comparison circuit. The shift register has a sufficient length that there is at least a high probability that the number of ones stored therein is different for the pattern in question from the range of number of ones found in that length of the data stream. The unitary adder counts the number of ones in the register, and this value is compared with the range of values which that length of the pattern should contain. If the pattern to be detected is a preamble used for bit synchronization, and the data are coded in a way which may lead to possibility of synchronization to a subharmonic, a ones-average detector may be used to disable the synchronization circuit for a local clock until the preamble is detected. For modest length preambles, there still should be sufficient length to synchronize the clock after preamble detection.

15 Claims, 3 Drawing Sheets

BA - BINARY ADDER

PATTERN DETECTION AND SYNCHRONIZATION CIRCUIT

BACKGROUND OF THE INVENTION

1. Field of the Invention

The invention relates to the field of data transmission and recording; and more particularly to systems in which a stream of sequences of encoded data is received or retrieved, interspersed or interleaved with bit patterns which provide control information. Identification of the particular patterns is often complicated by the fact that short, or sometimes not so short, portions of the data stream may closely match a portion of the particular pattern to be identified.

One class of bit stream which exhibits these characteristics is the signal from a magnetic playback head, reading a streaming magnetic tape used for information interchange between processing or communication systems. When economy of size or cost require that the bit rate, read out by the head, be only plesiosynchronous with respect to a given frequency (that is, close to but usually not exactly the same frequency) it is usually necessary to synchronize a local clock to the current bit rate coming from the head. Because data patterns often have irregular patterns of the binary values, hereinafter referred to as ones and zeroes, clock synchronization is typically aided by inserting preamble patterns periodically along the tape, particularly at the beginning of a record.

Particularly when, to aid in achieving high storage density, data are encoded in a code having a relatively large ratio between ones and zeroes, attempting to synchronize a clock can be difficult if the clock has a significant frequency difference from the bit rate of the head at the moment synchronization is being attempted. Typically synchronization involves a phase-locked loop; and erroneous synchronization to a sub-harmonic of the correct frequency is possible if a receiver starts to receive the bit stream during transmission of data, or a tape player has slewed at high speed or reversed to a portion of the tape, and resumes playback speed in the middle of a data block.

Preamble patterns intended to aid clock synchronization commonly consist of a string of alternating ones and zeroes, because bit synchronization to this pattern is fastest and most accurate; this pattern is relatively easy to identify even if it is not very long; and the end of the pattern is very easily identified by a change from simple alternation. In the field of data transmission involving modulation of a high frequency carrier frequency, such preamble patterns are desirable also because the average number of ones and zeroes is equal. This equality eliminates the build-up of an average dc level in certain demodulation schemes.

Other particular patterns which must be identified include end-of-data patterns. Such patterns may be used between unrelated data sequences, particularly when there is no gap in the bit stream.

2. Description of the Prior Art

For recording and playback of data on/from a quarter-inch magnetic tape having a large number of parallel longitudinal tracks, with a very high recording density and a very low corrected bit error rate, a data code proposed in the QIC Development Standard, revision E, as of Jan. 17, 1990 (hereinafter "QIC Standard"; published by Quarter-Inch Cartridge Drive Standards, Inc. of Santa Barbara, Calif., is a so-called (1, 7) code. This code has an average of approximately 2.3 times as many zeroes as ones, if the bit stream sample is long enough or if the enclosed data has been randomized (see "Monte Carlo Analysis of Recording Codes," Paul K. Davis, IEEE Trans. on Magnetics, Vol. MAG-20, No. 5, September 1984; "Statistical Properties of Selected Recording Codes" Thomas D. Howell, IBM Journal of R & D Vol. 33, No. 1 January 1989). This same standard may use an end-of-data burst consisting of strings of one one and seven zeroes. These seem easy to recognize or distinguish; but this is not so easy if readout or playback commenced in the data area well before the critical string, and as a result the local clock is not synchronized to the bit stream, nor is any decoder synchronized to individual bytes, blocks or frames.

In the QIC Standard each block of data starts with a preamble. All blocks within a frame are recorded without any gaps, and frames are also recorded continuously. Thus, there are no gaps at all along a given track. This is known as "seamless" recording. However, recognition of the preamble and end-of-data patterns are vital for identification of the beginning and end of a data block.

According to this same standard, a normal preamble has the defined minimum length: 13 bytes. This creates the problem that identification with a high degree of confidence must occur quickly if any portion of the preamble is to be used for any other purpose. At the same time, use of a comparator which has such a large capacity that the preamble is reliably recognized, particularly in the face of a small number of errors in the information stream from the read head, involves a significant amount of computing capacity and time.

Similarly, it is clear that end-of-data pattern will be very difficult to recognize in the face of a few errors, by comparing the exact bit pattern.

The problem of synchronization is most acute when "repositioning" occurs, that is, when the tape motion is stopped, the tape is reversed, and then is started forward again. Repositioning can occur for a variety of reasons, but, for example, one case occurs when the host computer has momentarily accepted as much data as it can handle, but during the resulting tape reversal it becomes ready to accept more data. In a seamless recording, when tape forward motion resumes, it is impossible to predict whether the tape drive's read head will be located over data, preamble, end-of-data or some other control pattern. Under these circumstances, the phase-locked loop may become synchronized to a sub-harmonic of the preamble pattern when codes such as (1, 7) are employed. This code has a large number of possible sequences of bits with long strings of encoded zeros which facilitates synchronization to sub-harmonics.

This problem does not occur with previous QIC standard codes even though they are also employed in a seamless fashion. Most existing QIC tape drives record using the so-called 4/5 GCR code where the probability of locking to a sub-harmonic of the clock frequency is practically zero. Furthermore, the problem would never occur on currently known half-inch digital tape drives regardless of the encoding method because they do not use seamless recording. They are designed to have unrecorded or erased gaps between records. The data recovery system (including the phase-locked loop) can always properly synchronize because the system can recognize a gap which is invariably followed by a preamble. Thus, the problem is unique to streaming tape drives employing seamless recording along with certain high efficiency channel codes such as (1, 7). The reason QIC and other standards organizations want to use these codes is that they permit a significantly higher amount of data to be stored on a given surface area. While another alternative to solution of the synchronization problem would be to drop seamless recording and include gaps between records, this would have the effect of reducing storage capacity of the tape, negating the advantages gained by using this code.

SUMMARY OF THE INVENTION

The object of the invention is to permit the use of seamless recording along with high-performance channel codes to achieve high information density while solving the synchronization or end of data recognition problem.

Another object of the invention is to provide an apparatus, for recovering data from a binary bit stream, which quickly identifies particular patterns having a different ratio of ones to zeroes from the data blocks of the bit stream.

Still another object of the invention is to enable detection of such patterns without a need for bit-by-bit comparison.

A further object of the invention is to provide such an apparatus which can detect a preamble pattern in time to complete clock synchronization before the end of the preamble.

Yet another object of the invention is to prevent synchronization of a receiver clock to a sub-harmonic of a coded data signal.

In accordance with the invention, a bit stream data receiver for receiving plesiosynchronous encoded binary signals, having a ratio of average numbers of bits of a first value to bits of a second value forming a particular control pattern, such as a particular pattern of ones and zeroes, compared with average numbers of bits of those values in data code blocks, comprises a circuit for determining the ratio of bits of those values over a sampling period sufficiently long to distinguish the measured ratio from the ratio measured by the same circuit when encoded data are being received. At the end of the sampling period the circuit provides a control signal which indicates recognition of the pattern.

In one embodiment according to the invention, this control signal is merely provided to other circuits in the apparatus, or is provided as an output from the apparatus.

In a preferred embodiment of the invention, the apparatus includes a cirucit for inhibiting an apparatus function, and recognition of the particular pattern disables the inhibiting circuit so that the function may proceed. In a particularly preferred embodiment, the apparatus function is synchronization using a phase-locked loop; the phase-locked loop is disabled, so that the clock runs at a given default frequency before recognition of the preamble; the pattern is a preamble pattern such as alternnating ones and zeroes, enabling quick, accurate clock synchronization; and the pattern recognition circuit is arragned to provide the control signal sufficiently before the end of the preamble pattern that the loop can synchronize the clock before the end of the preamble.

In another embodiment of the invention, advantageous when there is a low probabilty of the encoded data having a ratio of ones to zeroes approximately the same as the preamble when sampled for a period of n bits, the pattern recogniztion circuit is arranged to provide the control signal after sampling n bits and identifying them as a preamble pattern, thereby enabling clock synchronization to start sufficiently before the end of the preamble; and in response to a change in the observed ratio of ones to zeroes during the time that m-n subsequent bits are received, where the preamble has a length of m bits, the previous recognition is identified as being false. The pattern recognition circuit provides a further signal which causes the synchronization circuit to be disabled, and the clock to revert to the default frequency.

According to yet another aspect of the invention, the pattern recognition circuit is formed by an n bit shift register receiving the binary bit stream, a unitary adder for counting the number of ones in the register, and a comparator for determining if the number counted by the adder is approximately equal to $nR/(R+1)$, where R is the ratio of ones to zeroes in the pattern of interest.

Various advantageous embodiments are shown in the drawing and described below, but it will be clear to those skilled in the data recording and/or transmitting arts that the invention is not so limited.

DESCRIPTION OF THE PREFERRED EMBODIMENTS

Figure 1:
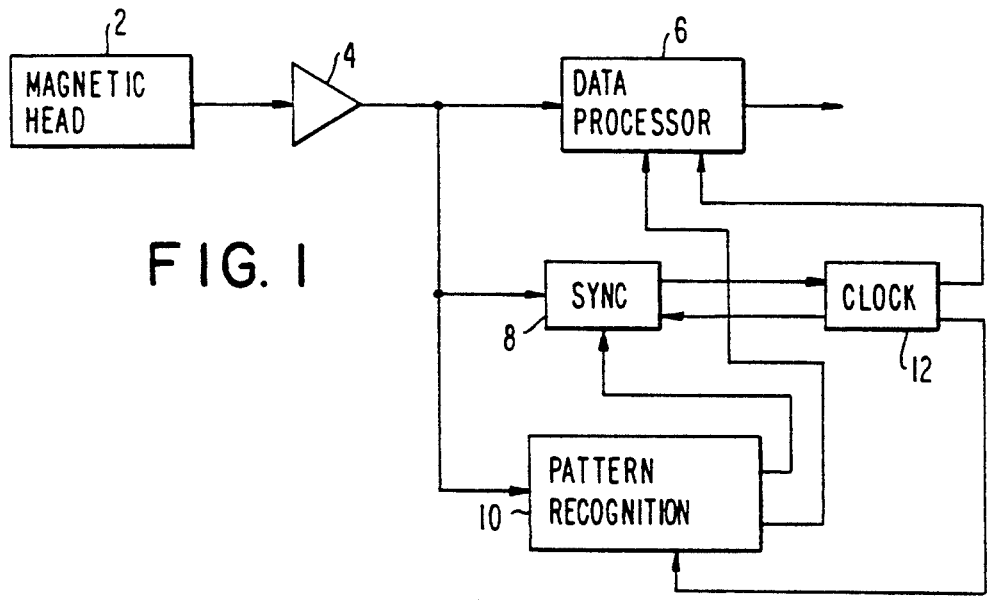
FIG. 1 is a block diagram of parts of a magnetic tape playback apparatus in accordance with the invention.

The apparatus portions shown in FIG. 1 can be part of a streaming magnetic tape apparatus of the type referred to above, or (by use of a different type of scanning head) any other kind of playback device which may produce a plesiosynchronous bit stream, such as an optical information storage device. Preferably the bit stream coming from the head has a bit rate which is close to a pre-determined frequency; for example, within 5% of nominal value. The principal differences would reside in the specific nature of the head or scanning device, and the form of pulses or other information waveform.

In the embodiment of a magnetic playback device, a magnetic head 2 produces an electrical signal which is amplified, and may be shaped or filtered, in an amplifier 4. The amplifier output is provided as an input to a data processor device 6 which does something useful with the data contained in the bit stream. The data processor 6 may be a separate apparatus, such as a monitor or computer, or may be integrated with the rest of the apparatus shown in FIG. 1.

In order to synchronize and control the data processor 6, the amplifier 4 output is also provided to a synchronizer 8 and a pattern recognition circuit 10. The synchronizer 8 may be of any well known type, such as a phase-locked loop, and is either connected to or integrated with a clock 12. The clock 12 is also of any well-known type which provides a pre-determined free-running frequency, equal to the nominal bit rate coming from the head 2, when the synchronizer 8 is inhibited or is not receiving any signal from the amplifier 4.

When the circuit of FIG. 1 is used to receive data whose binary form or encoding has a relatively large ratio, such as 2.3:1, between ones and zeroes, when averaged over a sufficient number of bytes, synchronization to the data signal from the free running frequency may be unreliable because of the possibility of synchronizing to a sub-harmonic of the actual bit rate. To prevent erroneous synchronization after any period of loss of synchronization, such as initial turn-on or after the tape has been slewed at higher speed, reversed in direction, or stopped, the pattern recognition circuit 10 provides an inhibit signal to the synchronizer 8. The inhibit signal causes the synchronizer to cause the clock to operate free-running. The clock and the tape drive are designed such that the free-running frequency is close enough to the actual bit rate so that the pattern recognition circuit, which is preferably of the form described below, can function with accurately to distinguish between data signals and a preamble signal such as a series of alternating ones and zeroes.

The pattern recognition circuit is designed to identify existence of a preamble pattern in the bit stream well before the end of the preamble pattern has been reached. As soon as the current bit stream has been identified as a preamble pattern, the signal to the synchronizer 8 is changed, so that the synchronizer is no longer inhibited. Sufficient length of preamble remains for the synchronizer/clock combination to lock in on the bit rate before receipt of data signals. The QIC standard referred to above has a preamble length of 13 8-bit bytes. Allowing at least 7 bytes for synchronization, and recognizing the uncertainty in preamble recognition which is described below, a window or sample of 36 bits or more is a preferred value for the pattern recognition circuit to use.

An alternative method of operation is advantageous when, because of randomizing or other processes, the nature of the data signal creates a small probability that the ratio of ones to zeroes sampled over a period of 36 bits will be substantially equal to a value which the preamble recognition circuit recognizes as a preamble. According to this alternative, the synchronizer 8 starts to synchronize upon receipt of a preamble-recognized signal from the circuit 10. However, the circuit 10 continues to process the bit stream for the duration of the preamble length (68 additional bits duration, for a 13 byte preamble) and provides a synchronization-inhibit signal to the synchronizer if the detected pattern does not remain as a preamble pattern. With this circuit and operating mode, there is a high probability of lock-in at the correct frequency on the first try, even in the face of a data coding protocol which makes incorrect synchronization possible.

Figure 2:
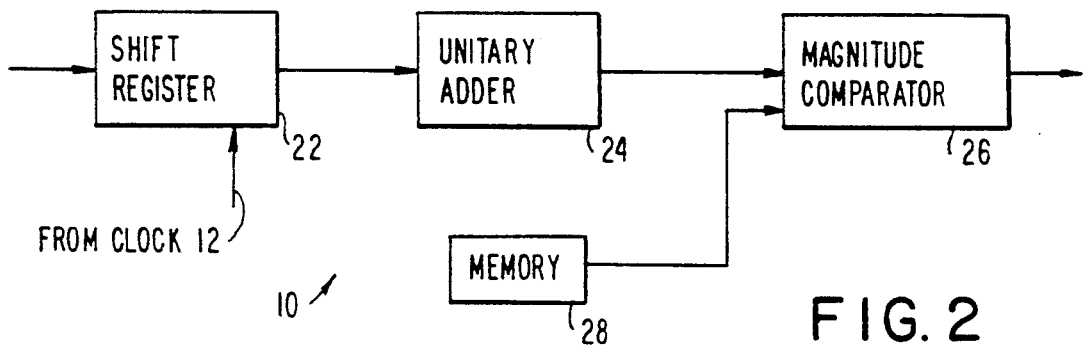
FIG. 2 is a block diagram of the pattern recognition circuit used in FIGS. 1 and 2.

The pattern recognition circuit 10 is shown in block form in FIG. 2. A 36 bit shift register 22 receives the bit stream from the amplifier 4 (FIG. 1). The register is shifted by a signal from the clock 12, which may be slightly out of synchronization with the bit stream if it is free running at the time. The register 22 is connected by a parallel line to a unitary adder 24, which continually provides an output signal which is a count of the number of ones in the register 22. This output signal count is compared in a magnitude comparator 26 with a value from a memory 28. The comparator 26 may be, for example, a National Semiconductor Corp. type 7485 or equivalent. For the typical preamble pattern of alternating ones and zeroes, the value 16 is stored in the memory 28. The comparator 26 changes the recognition circuit output from inhibit to non-inhibit if the unitary adder output is greater than the value 16.

For detecting the end-of-data pattern of the QIC standard referred to above, the least significant bit of the register can be ignored, and the comparator can be set to detect a register total 4. As is well known, this will then detect a value of 4 or 5 ones. If a register of length n different from 36 is selected, then the comparator should be set to detect integer values no less than approximately n/9 and no more than approximately n/7.

Figure 3:
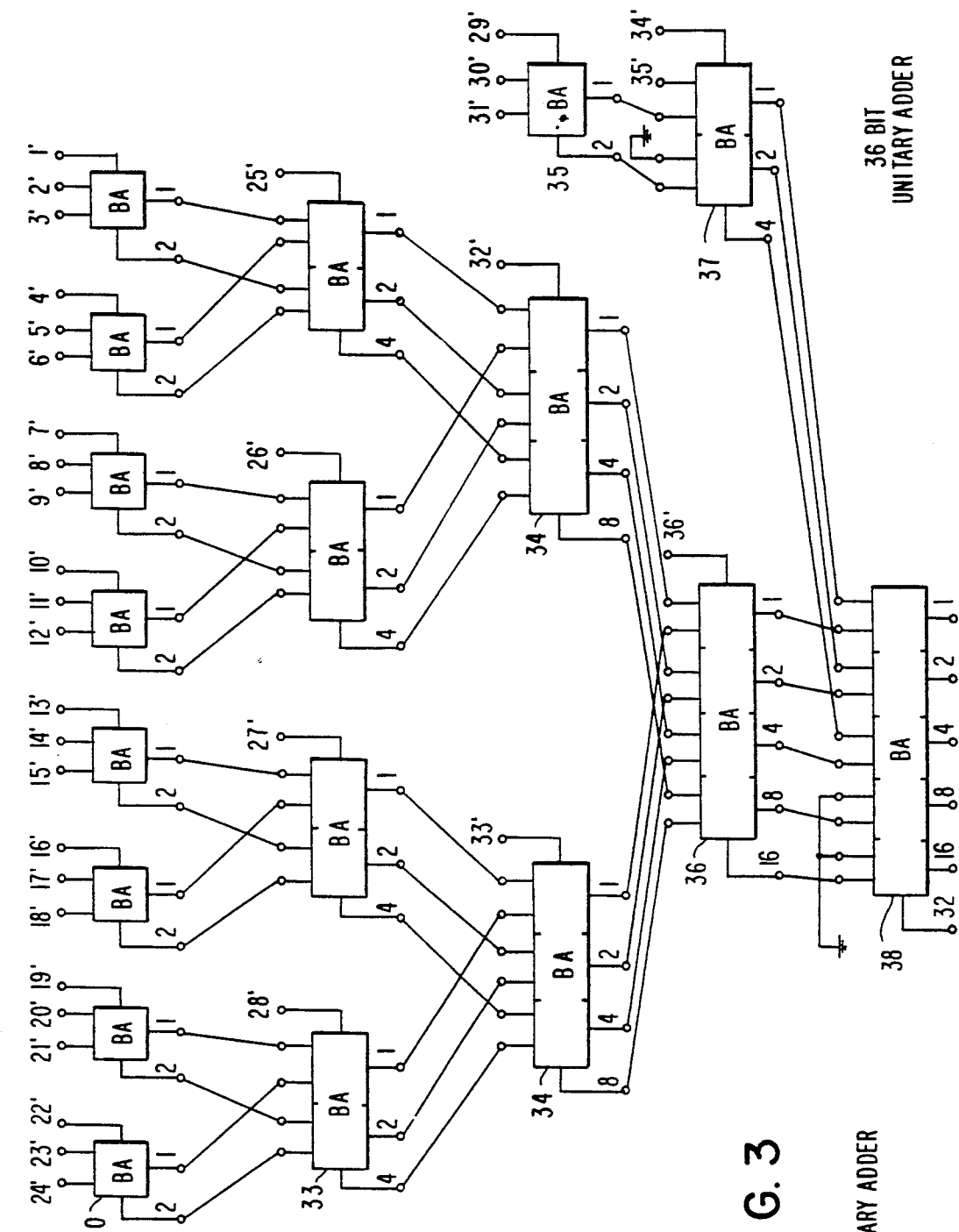
FIG. 3 shows a unitary adder useful in the pattern recognition circuit.

FIG. 3 shows one circuit for forming a unitary adder. Eight identical first-row binary adders 30 are connected to the stages 1'-24' of the register 22.

Outputs of the first 8 binary adders are connected respectively to four second-row 5-input binary adders 33, which also respectively receive inputs from register stages 25'-28'.

Outputs of the adders 33 are in turn connected to inputs of three third-row adders: two 7-input binary adders 34 and one 3-input adder 35, which respectively also receive signals from register stages 33', 32' and 29'-31'.

Outputs of the third row adders are in turn connected to two fourth row adders: a 9-input adder 36 which also receives an input from stage 36 of the register 22, and a 5-input register 37 which also receives an input from stages 34' and 35' of the register 22.

Outputs of the fourth row adders 36 and 37 are connected to inputs of an 11-input binary adder 38 which has a parallel output connected to corresponding inputs of the magnitude comparator 26.

The various binary adders can be, for example, National Semiconductor type 7483's or combinations of them. As will be well known by those of ordinary skill, for the first row adders 30, the two most significant inputs should be grounded. Adder 38 in the fifth row can be provided by two cascaded type 7483's.

Figure 4:
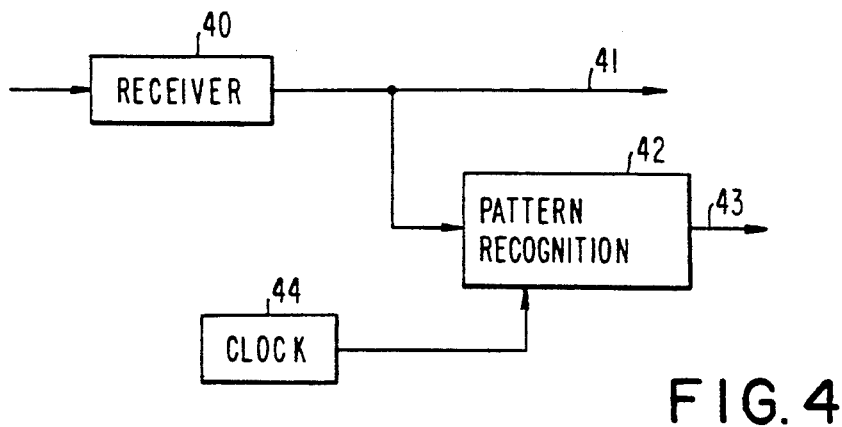
FIG. 4 is a block diagram showing a generalized apparatus according to the invention.

FIG. 4 shows another use of average-measuring pattern recognition circuits. A receiver 40 may be a wired or wireless data receiver, a tape or optical disc reader, or any other source of a bit stream which contains (or can be processed to provide) binary values, some of which are in particular patterns to be identified. A data line output 41 from the receiver 40 may be provided to any other desired unit or device. At the same time, the bit stream output of the receiver 40 is fed to a pattern recognition circuit 42, which may be identical to the circuit 10 or may be designed to identify a pattern having a different ratio of ones and zeroes which is unique with respect to any sufficiently long sample of the data.

A clock 44 provides the shift signal to the shift register in the recognition circuit 42. This clock may be synchronized to the output of receiver 40, or may have a fixed frequency which is sufficiently close to the bit rate being measured.

Upon determining a match of the number of ones in the sample being analyzed by the recognition circuit 42, a control signal is provided over an output line 43 to show that a match has occurred. This control signal may be used for any function operating an annunciator to alert an operator; changing an operating mode of the apparatus itself; or appearing at an apparatus output to be used by some other apparatus.

Figure 5:
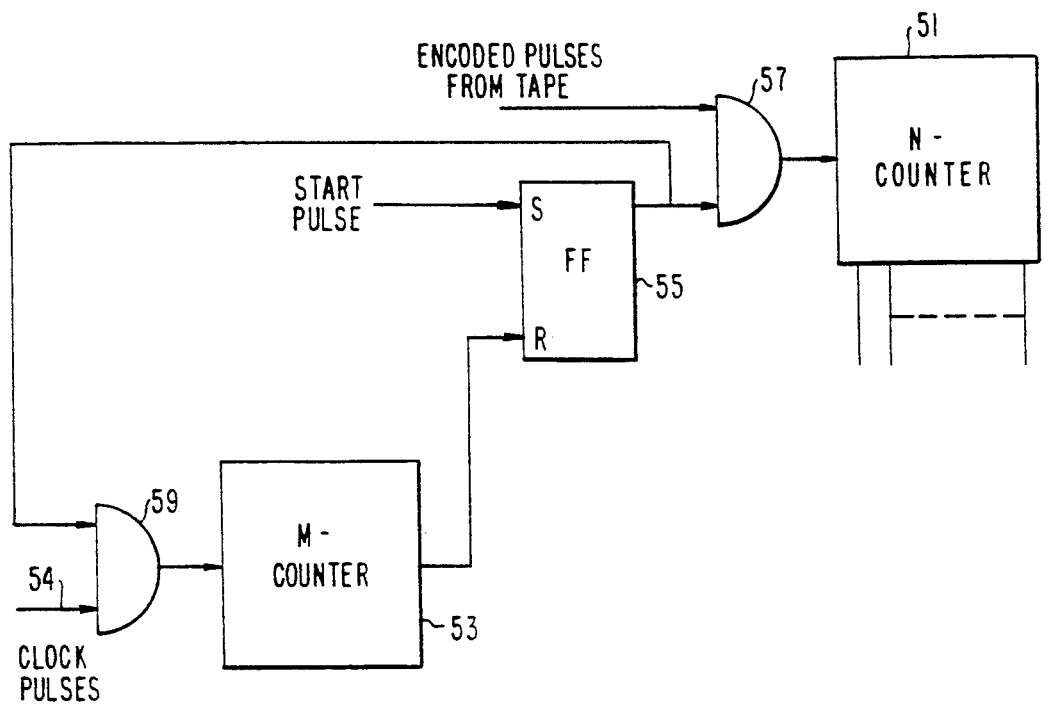
FIG. 5 is a block diagram of another pattern recognition circuit.

Those of ordinary skill in the recording arts will recognize that many variations of the described embodiments may use the inventive concept. For example, in the circuit of FIG. 5, a counter 51 counts encoded pulses (ones) read from a tape, for a duration controlled by a second counter 53. The counter 53 in turn is driven by pulses from a clock 54 which may be free running. The output of counter 53 is fed to one input of a flip-flop 55 whose output is one of two inputs to an AND gate 57. The gate 57 acts as switch to accept or block pulses read from the tape, the gate output being the input of counter 51. At the same time, the flip-flop 55 output serves as the other input of a clock-pulse AND gate 59, which gates the clock pulses to counter 53.

After n clock pulses are counted by counter 53, the state of counter 51 is tested. If the count n of counter 51 equals m, or m minus a small integer, a preamble has been detected. If n is approximately equal to m/7, an end-of-data burst has been detected.

Accordingly, it is clear that the scope of the invention covers many possible embodiments, and is to be measured by the appended claims.

We claim:

1. An apparatus for recovering data from a binary bit stream, each bit being a first value or a second value different from said first value, said stream containing at least data and sequences of a particular pattern interleaved with said data, wherein said particular pattern has a given ratio R of average numbers of bits of said first value to bits of said second value, and a length of at least m bits, where m is an integer and R is a ratio of two integers, comprising:

data detector means, operable while said apparatus is in a data detection mode, for detecting said data in said bit stream, and means, responsive to at least one control signal, for controlling said apparatus, characterized in that said apparatus comprises:

a pattern detection circuit comprising means for determining the ratio r of bits of said first value to bits of said second value over an n bit sampling period, where n is an integer and r is a ratio of two integers, and n≦m, for detecting reception of said particular pattern responsive to receipt of at least n bits of said pattern, and means for providing said one control signal to said means for controlling responsive to determination that said ratio r over said n bit sampling period is substantially equal to said given ratio R.

2. An apparatus as claimed in claim 1, characterized in that said pattern detection circuit comprises:

an n bit shift register receiving said binary bit stream, a unitary adder connected to said register for counting the number of ones in said register, and a comparator for determining if the number counted by said adder is substantially equal to nR/(R+1).

3. An apparatus as claimed in claim 1, for recovering data from said bit stream wherein said particular pattern is a plurality of bits alternating between said first value and said second value, characterized in that said pattern detection circuit comprises:

an n bit shift register receiving said binary bit stream, where n is an even number, a unitary adder connected to said register for counting the number of ones in said register, and a comparator for determining if the number counted by said adder is substantially equal to n/2.

4. An apparatus as claimed in claim 1, for recovering data from said bit stream wherein said data have respective ratios of average numbers of bits of said first value to bits of said second value different from R when averaged over a length of at least n bits, characterized in that said pattern detection circuit continues determining said ratio for an additional period of m-n bits, and said apparatus further comprises means for providing a further control signal to said means for controlling responsive to determination during said additional period that the ratio r determined during said additional period is not substantially equal to said given ratio.

5. An apparatus as claimed in claim 1, for recovering data from said bit stream wherein said data have respective ratios of average numbers of bits of said first value to bits of said second value different from R when averaged over a length of at least n+k bits, where k is an integer, and k>0, and a probability P that the ratio of bits of said first value to bits of said second value in the data differ from said given ratio when averaged over at least k bits, characterized in that said pattern detection circuit continues determining said ratio for an additional period m-n bits, and said apparatus further comprises means for providing a further control signal to said means for controlling responsive to determination during said additional period that the ratio r determined during said additional period is not substantially equal to said given ratio.

6. An apparatus as claimed in claim 1, characterized in that said particular pattern is an end-of-data pattern consisting of one and at least seven zeroes, and said means for determining comprises:

an n bit shift register receiving said binary bit stream, a unitary adder connected to said register for counting the number of ones in said register, and a comparator for determining if the number counted by said adder is at least approximately n/9 and no more than approximately n/7.

7. An apparatus for recovering data from a plesiosynchronous binary bit stream, each bit being a one or a zero, said stream containing at least encoded data and sequences of a preamble pattern interleaved with said data, wherein said preamble pattern has a given ratio R of ones to zeroes when averaged over at least n bits, and a length of at least m bits, where m and n are integers and R is a ratio of two integers, and m>n; and said data are encoded according to a code producing a probability P that the ratio of ones to zeroes in the coded data differs from said given ratio R when averaged over at least n bits, and a ratio of ones to zeroes different from said given ratio R when averaged over at least n+k bits, where k is an integer, and k>0, comprising:

a variable frequency clock, data detector means, synchronized by said clock, for detecting said data in said bit stream, and means for synchronizing said clock to said bit stream, characterized in that said apparatus comprises:

a preamble detection circuit, comprising means for determining the ratio r of ones to zeroes over an n bit sampling period, where r is a ratio of two integers, for detecting said preamble pattern responsive to receipt of n bits of said pattern, and means for disabling said means for synchronizing until said preamble detection circuit has detected said preamble pattern.

8. An apparatus as claimed in claim 7, characterized in that said preamble detection circuit comprises:

an n bit shift register receiving said binary bit stream, a unitary adder connected to said register for counting the number of ones in said register, and a comparator for determining if the number counted by said adder is substantially equal to nR/(R+1).

9. An apparatus as claimed in claim 7, for recovering data from said bit stream wherein said preamble pattern is a series of m bits alternating between one and zero, characterized in that said preamble detection circuit comprises:

an n bit shift register receiving said binary bit stream, where n is an even number, a unitary adder connected to said register for counting the number of ones in said register, and a comparator for determining if the number counted by said adder is substantially equal to n/2.

10. An apparatus as claimed in claim 7, characterized in that said preamble detection circuit continues determining said ratio r for an additional period of m-n bits, and said apparatus further comprises means for providing a further control signal to said means for disabling responsive to determination during said additional period that the ratio r determined during said additional period is not substantially equal to said given ratio R.

11. An apparatus as claimed in claim 10, wherein said data from a plesiosynchronous binary bit stream are recorded data encoded with a 1, 7 code with said preamble pattern being a series of m bits alternating between one and zero, characterized in that said preamble detection circuit comprises:

an n bit shift register receiving said binary bit stream, where n is an even number, a unitary adder connected to said register for counting the number of ones in said register, and a comparator for determining if the number counted by said adder is substantially equal to n/2.

12. An apparatus for recovering data from a binary bit stream, each bit being a first value or a second value different from said first value, said stream containing at least data and sequences of a preamble pattern interleaved with said data, wherein said preamble pattern has a length of at least m bits, and a given ratio R of average numbers of bits of said first value to bits of said second value, where m is an integer and R is a ratio of two integers; and said data are coded to have a ratio of average numbers of bits of said first value to bits of said second value different from said given ratio when averaged over at least k bits, where k is an integer, comprising:

a variable frequency clock, data detector means, synchronized by said clock, for detecting said data in said bit stream, and means for synchronizing said clock to said bit stream, characterized in that said apparatus comprises:

a preamble detection circuit, for detecting reception of said preamble pattern responsive to receipt of n bits of said pattern, where n is an integer, and $n<m$; $n \leq k$; and said circuit comprises means for determining the ratio of average numbers of bits of said first value to bits of said second value over an n bit sampling period, and means for disabling said means for synchronizing until said preamble detection circuit has detected said preamble pattern.

13. An apparatus as claimed in claim 12, characterized in that said preamble detection circuit comprises:

an n bit shift register receiving said binary bit stream, a unitary adder connected to said register for counting the number of bits of said first value in said register, and a comparator for determining if the number counted by said adder is substantially equal to n/R.

14. An apparatus for recovering data from a binary bit stream, each bit being a first value or a second value different from said first value, said stream containing at least data and sequences of a preamble pattern interleaved with said data, wherein said preamble pattern has a length of at least m bits, and a given ratio R of average numbers of bits of said first value to bits of said second value, where m is an integer and R is a ratio of two integers; and said data are coded to have a probability P that the ratio of bits of said first value to bits of said second value in the coded data differ from said given ratio when averaged over at least k bits, where k is an integer, comprising:

a variable frequency clock, data detector means, synchronized by said clock, for detecting said data in said bit stream, and means for synchronizing said clock to said bit stream, characterized in that said apparatus comprises:

a preamble detection circuit, for detecting reception of said preamble pattern responsive to receipt of n bits of said pattern, where n is an integer, an $n<m$; $n<k+1$, and means for disabling said means for synchronizing until said preamble detection circuit has detected said preamble pattern, and wherein said preamble detection circuit comprises means for determining the ratio r of bits of said first value to bits of said second value over an n bit sampling period, where r is a ratio of two integers, and, responsive to determination that said ratio r over said n bit period equals said given ratio R, providing to said means for disabling a signal that said preamble pattern is detected, said preamble detection circuit continues determining said ratio r for an additional period of time, and said apparatus further comprises means for disabling said means for synchronizing responsive to determination during said additional period that said ratio r is not substantially equal to said given ratio R.

15. An apparatus as claimed in claim 14, characterized in that said preamble detection circuit comprises:

an n bit shift register receiving said binary bit stream, a unitary adder connected to said register for counting the number of bits of said first value in said register, and a comparator for determining if the number counted by said adder is substantially equal to n/R.

* * * * *